United States Patent [19]

Tokunaga et al.

[11] Patent Number: 4,564,214
[45] Date of Patent: Jan. 14, 1986

[54] SUSPENSION SYSTEM FOR MOTOR VEHICLE HAVING VARIABLE SUSPENSION CHARACTERISTICS

[75] Inventors: Toshimichi Tokunaga; Seita Kanai; Yoshiaki Anan, all of Hiroshima, Japan

[73] Assignee: Mazda Motor Corporation, Hiroshima, Japan

[21] Appl. No.: 589,946

[22] Filed: Mar. 15, 1984

[30] Foreign Application Priority Data

Mar. 18, 1983 [JP] Japan .................... 58-46498

[51] Int. Cl.$^4$ ............................ B60G 17/08
[52] U.S. Cl. .................... 280/707; 280/708; 280/772; 280/6 R; 280/6 H; 180/41; 180/141
[58] Field of Search ............ 364/424; 280/707, 772, 280/112 A, 6 R, 6 H; 181/141, 41

[56] References Cited

U.S. PATENT DOCUMENTS 3,608,925  9/1971  Murphy ................ 280/707
4,361,346 10/1982  Harris .................. 280/707
4,468,739  8/1984  Woods et al. ........ 280/707

FOREIGN PATENT DOCUMENTS 147107 11/1981 Japan .

Primary Examiner—Richard A. Bertsch
Attorney, Agent, or Firm—Fleit, Jacobson, Cohn & Price

[57] ABSTRACT

Suspension mechanisms for motor vehicles include dampers of variable damping powers and air springs of variable spring coefficients so that the suspension characteristics are changed between soft and hard modes. The suspension mechanisms are provided with a controller for producing a control signal only when the differential value between the value of a last steering angle and an average value of steering angles is larger than a predetermined value to change the suspension characteristics to the hard mode. In accordance with this arrangement, the suspension characteristics are changed to the hard mode only when the rolling angle of the vehicle exceeds a predetermined value.

10 Claims, 9 Drawing Figures

SUSPENSION SYSTEM FOR MOTOR VEHICLE HAVING VARIABLE SUSPENSION CHARACTERISTICS

The present invention relates to motor vehicles, and more particularly to motor vehicles having suspension means for variably adjustable characteristics. More specifically, the present invention pertains to control means for such adjustable suspension means.

In a motor vehicle, it has been known to suppress vehicle rolling movements by strengthening the characteristics of the suspension mechanisms, such as the damping rates of dampers and/or the spring coefficients of suspension springs when the vehicle is steered. For example, in Japanese utility model application No. 55-46386 filed on Apr. 8, 1980 and disclosed for public inspection on Nov. 6, 1981 under the disclosure number No. 56-147107, there is proposed in motor vehicles provided with shock absorbers for front and rear wheels to detect the vehicle rolling rate by a steering angle sensor and a vehicle speed sensor, and to control the shock absorbers so that their damping rates are increased when the rolling rate exceeds a predetermined value. The proposed control is, however, disadvantageous in that during high speed vehicle operation the damping rates of the shock absorbers may be increased even with a very small angle of steering movement, which is comparable to play in the steering mechanism. Furthermore, even when the vehicle is under a steady turning movement wherein the vehicle is steered by a constant angle under a constant vehicle speed, the shock absorbers may be hardened although the rolling angle of the vehicle will be maintained substantially constant. In other words, the rolling of the vehicle has an adverse effect on the riding comfort only when the vehicle is being rolled to and from a sidewardly inclined attitude, but it is not necessary to make the suspension mechanisms hard when the vehicle is maintained at a constantly inclined attitude. Nevertheless, the shock absorbers are hardened in the aforementioned prior art when the vehicle is steadily turning.

In order to overcome the above problems, it may be possible to control the characteristics of the suspension mechanism in accordance with steering speed, or a time differential value of the steering angle, to make the shock absorbers hard only when the time differential of the steering angle is larger than a predetermined value, namely, only while the steering wheel is turned beyond a predetermined rate. With this control, the characteristics of the suspension mechanism can be returned to the original characteristics, or soft characteristics, to improve the riding comfort of the vehicle when the vehicle is steadily steered. However, even with this control, there still remains the problem that the suspension mechanisms are hardened due to play in the steering mechanism.

It is therefore an object of the present invention to provide vehicle suspension control means in which the characteristics of the suspension mechanisms are not changed due to the play of the steering mechanism, but changed only when the vehicle is being rolled to and from a sidewardly inclined attitude.

Another object of the present invention is to provide suspension control means in which suspension mechanisms are adjusted so that desirable stability and riding comfort can be obtained.

In accordance with the present invention, the above and other objects can be accomplished by a motor vehicle including a body, wheels for supporting said body, suspension means between said body and respective ones of said wheels, said suspension means including resistance means which provide resistance to vertical movements of said body with respect to said wheels, adjusting means for adjusting said resistance means of the suspension means to change said resistance characteristics, steering angle sensing means for producing steering angle signals, control means for controlling said adjusting means, said control means including means for comparing a most recently produced steering angle singal with an average value of previously produced steering angle signals and generating a difference signal denoting a difference between said most recently produced steering angle signal and said average value of said previous steering angle signals, and means for comparing said difference signal with a predetermined value and operating said adjusting means to strengthen the said resistance characteristics of said suspension means when said difference signal is larger than said predetermined value.

A suspension mechanism for motor vehicles usually includes damping means having damping characteristics and spring means having a spring coefficient. In this type of suspension mechanism, the resistance characteristics are determined by the damping characteristics and/or the spring coefficient so that the resistance characteristics can be changed by adjusting one or both of these factors. In order to make it possible to adjust the spring coefficient, the spring means may preferably be comprised of an air spring. The air spring may have an air chamber connected through a solenoid value with a control chamber so that the effective volume of the air chamber can be changed by an operation of the solenoid value. Alternatively, the suspension means may include an oleo damper having a piston formed with orifice means of adjustable diameter. Such an oleo damper may be used in combination with the above described air spring. Any other means may further or alternatively be used for adjusting the resistance characteristics of the suspension means.

The above calculation means may be of the type which calculates an average value of some or all of sequential steering angle signals produced by the steering angle sensing means up to the time the sensing means produces the last steering angle signal. Alternatively, the calculation means may be of the type which calculates a weighted average value of steering angle signals generated by the steering angle sensing means up to the time the means generates the last steering angle signal. The above mentioned control means compares the last steering angle signal with the average value calculated by the calculation value to control the resistance characteristics of the suspension means.

The above and other objects and features of the present invention will become apparent from the following descriptions of preferred embodiments with reference to the accompanying drawings, in which.

Figure 1:
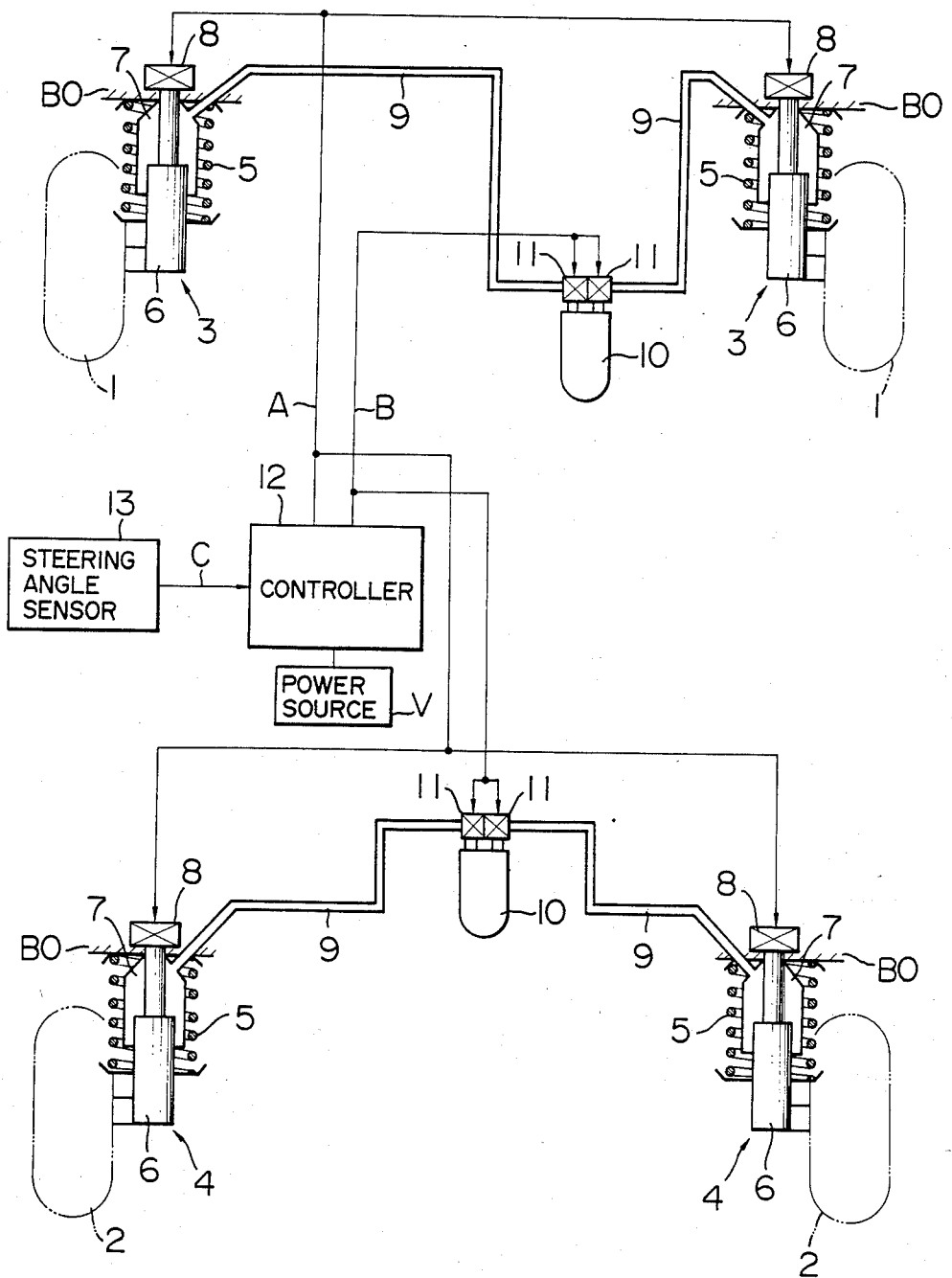
FIG. 1 is a diagrammatical illustration of a suspension mechanism with a suspension adjusting system in accordance with one embodiment of the present invention.

Referring now to the drawings, particularly to FIG. 1, there is shown a motor vehicle having a body BO and a pair of front wheels 1 and a pair of rear wheels 2. There are provided front suspension mechanisms 3 between the body BO and the front wheels 1. The rear wheels 2 also support the body BO through rear suspension mechanisms 4. The front and rear suspension mechanisms 3 and 4 each include a shock absorber which is comprised of a spring 5, an oleo damper 6 and an air chamber 7. The oleo damper 6 is of a variable orifice type as described later in detail with reference to FIGS. 2 and 3 in which the piston of the damper 6 has an orifice of variable diameter. The orifice diameter is selectively changed between a normal and a reduced diameter by an actuator such as a step motor 8. When the orifice diameter is set to the reduced diameter the damping rate of the damper 6 is increased.

The air chambers 7 are connected through air pipes 9 with air accumulators 10. In order to control the communication between the air chambers 7 and the air accumulators 10, there are provided solenoid valves 11 in the air pipes 9. The step motors 8 and the solenoid valves 11 are connected with a controller 12 which may be a microcomputer, and is adapted to receive a supply of electric power from a power source V and produce drive signals A and B in accordance with a signal C from a steering angle sensor 13. The step motors 8 are operated by the signal A and the solenoid valves 11 are energized by the signal B.

Figure 3:
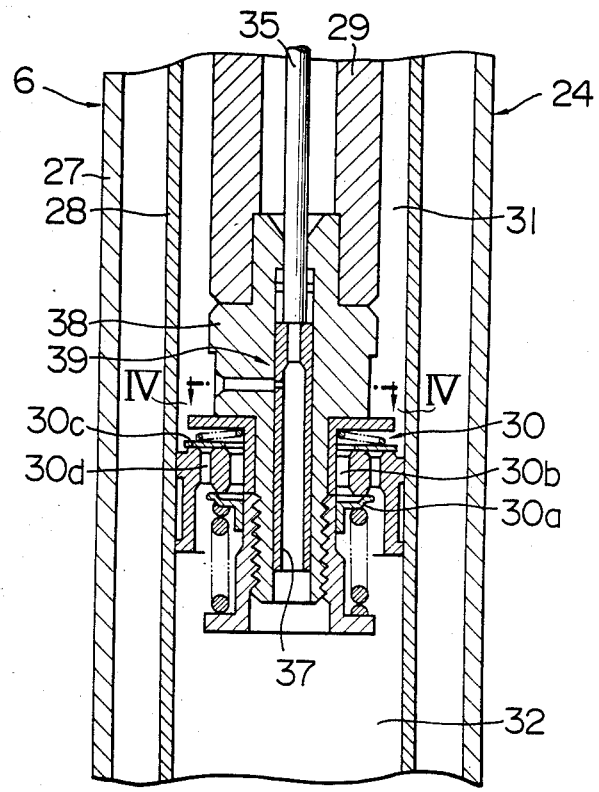
FIG. 3 is an enlarged sectional view of a part of the suspension device shown in FIG. 2.
Figure 4:
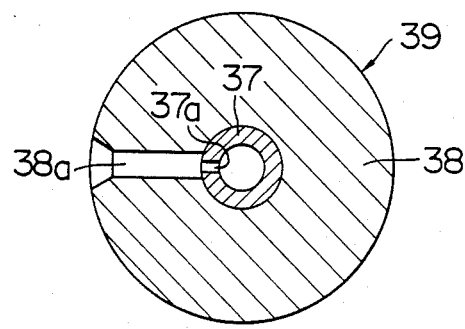
FIG. 4 is a sectional view taken along the line IV—IV in FIG. 3.

The detailed structure of the suspension mechanism will be described with reference to FIGS. 2 to 4.

Figure 2:
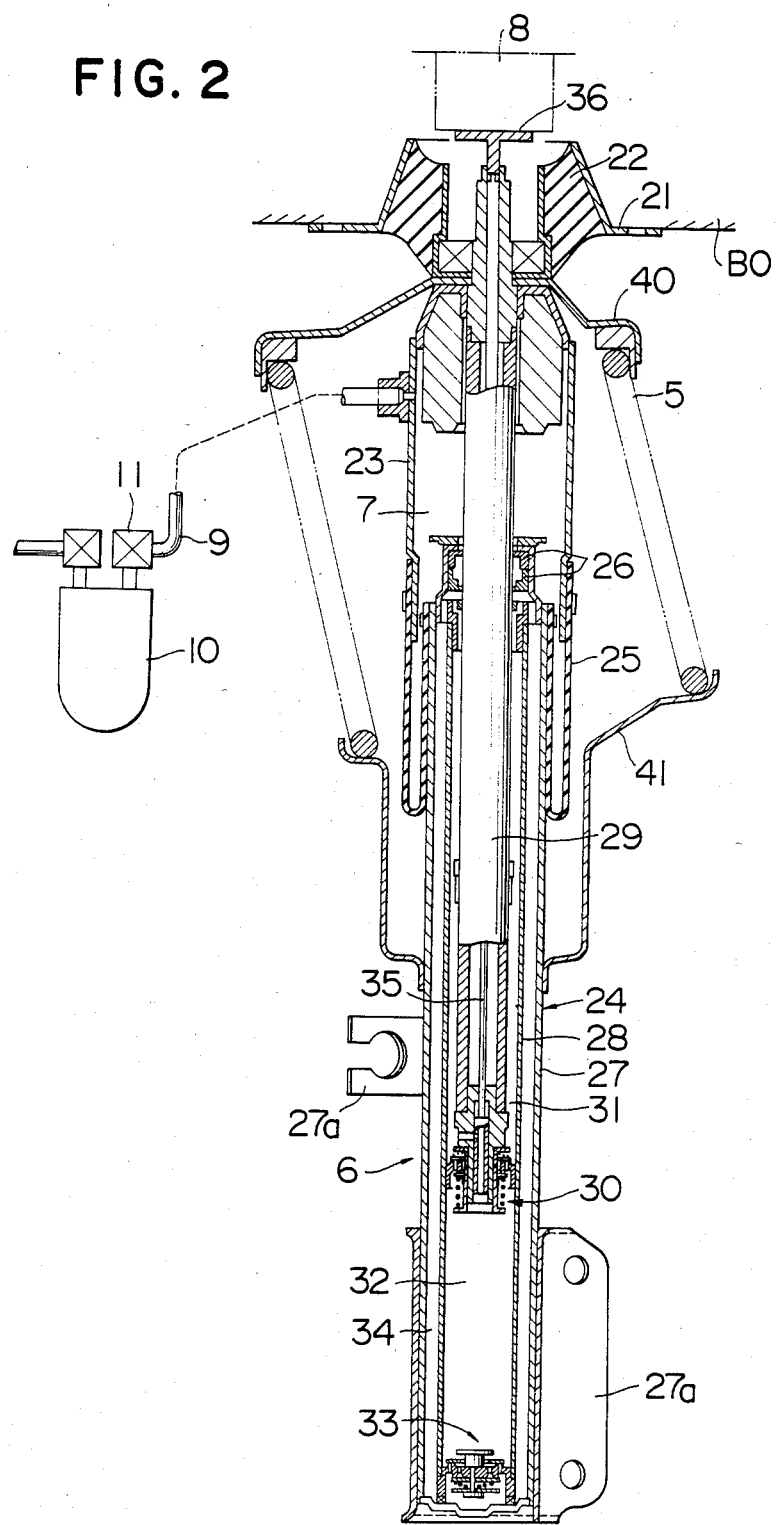
FIG. 2 is a vertical sectional view of the suspension device in the embodiment shown in FIG. 1.

Referring to FIG. 2, the suspension mechanism is mounted at its upper end on the body of the vehicle by means of a mounting member 21 and a resilient member 22, and includes an upper case 23 constituting the air chamber 7 and a lower case 24 movable up and down in relation to the upper ease 23. The lower end of the upper case 23 is connected with the upper end of the lower case 24 by means of a rolling diaphragm 25. The inside of the upper case 23 is separated from the inside of the lower case 24 by a sealing member 26. The lower case 24 is comprised of an outer tube 27 and an inner tube 28. There is inserted a piston rod 29 in the inner tube 28 which is slidable up and down with respect to the inner tube 28. The piston rod 29 is provided with a main valve 30 at its lower portion which constitutes a piston. The inner chamber of the inner tube 28 is divided into an upper oil chamber 31 and a lower oil chamber 32. The inner tube 28 is provided with a bottom valve 33 at its lower end. The space between the outer and inner tubes 27 and 28 functions as a reservoir chamber 34.

The outer tube 27 is provided with a mounting bracket 27a for rotatably supporting the wheel 1 or 2. The main valve 30 is formed with first and second orifices 30b and 30d as shown in FIG. 3. The first orifices 30b are provided with a check valve 30a which permits the passage of hydraulic oil only from the upper oil chamber 31 to the lower oil chamber 32 to extend the damper 6. The second orifices 30d are provided with a check valve 30c which permits the passage of hydraulic oil only from the lower oil chamber 32 to the upper oil chamber 31 to shorten the damper 6.

The piston rod 29 in the damper 6 is of a hollow structure and has a control rod 35 rotatably inserted therein. The control rod 35 is rotated by the step motor 8 through a key 36 which is engaged with the upper end of the control rod 35. There are provided a valve body 37 at the lower end of the control rod 35 and a valve case 38 at the lower end of the piston rod 29 which constitute an orifice valve 39. Speaking more specifically, as shown in FIG. 4, there is formed a passage 38a in the tubular valve case 38 for providing communication between the upper oil chamber 31 and the lower oil chamber 32, which is intercepted due to the rotation of the valve body 37 fitted in the case 38, or opened through the orifice 37a in the valve body 37. Thus, the upper and lower oil chambers 31 and 32 in communication with each other only through the first or second orifice 30b or 30d in the main valve 30, or through the first or second orifice 30b or 30d and the orifice 37a of the orifice valve 39. The damping rate of the damper 6 is selectively changed between a "soft" mode having a relatively weak damping rate and a "hard" mode having a relatively strong damping rate.

As shown in FIG. 2, there are provided a spring seat 40 on the upper case 23 and a spring seat 41 on the lower case 24 between which the coil spring 5 is mounted. The coil spring 5 and the air within the air chamber 7 constitute a spring device in the suspension mechanism. In this arrangement, since the air chamber 7 is in communication with the accumulator 10 through the air pipe 9 and the solenoid valve 11, the overall volume of the air spring is changed by the solenoid valve 11 so that the spring coefficient of the air spring is selectively changed to provide a "soft" mode having a relatively low spring coefficient and a "hard" mode having a relatively high spring coefficient.

Figure 5:
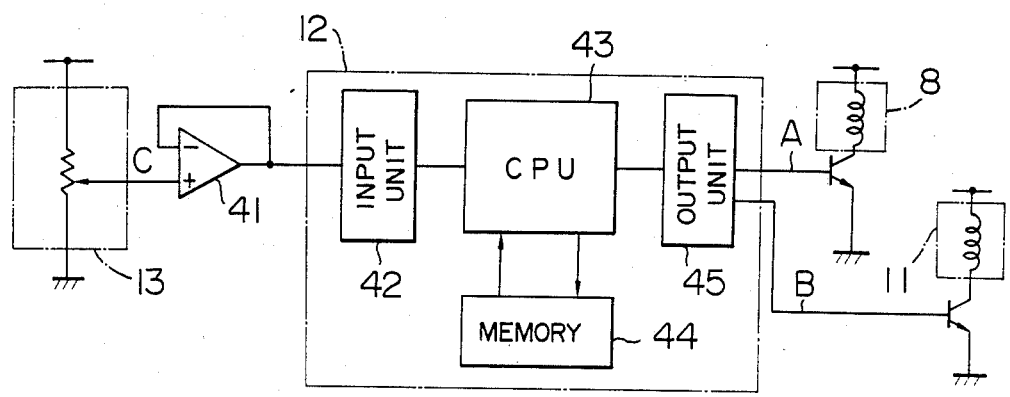
FIG. 5 is a circuit diagram showing the controller used in the embodiment of FIG. 1.

As shown in FIG. 5, the controller 12 is comprised of an input unit 42 for receiving the steering angle signal C from the steering angle sensor 13 through an amplifier 41, a central processing unit (CPU) 43 connected with the input unit 42, a memory 44 connected with the CPU 43, and an output unit 45 connected with the CPU 43. The output unit 45 is connected with the step motor 8 and the solenoid valve 11 to supply the driving signals A, B to the step motor 8 and the solenoid valve 11 in accordance with an output signal from the CPU 43.

Figure 6:
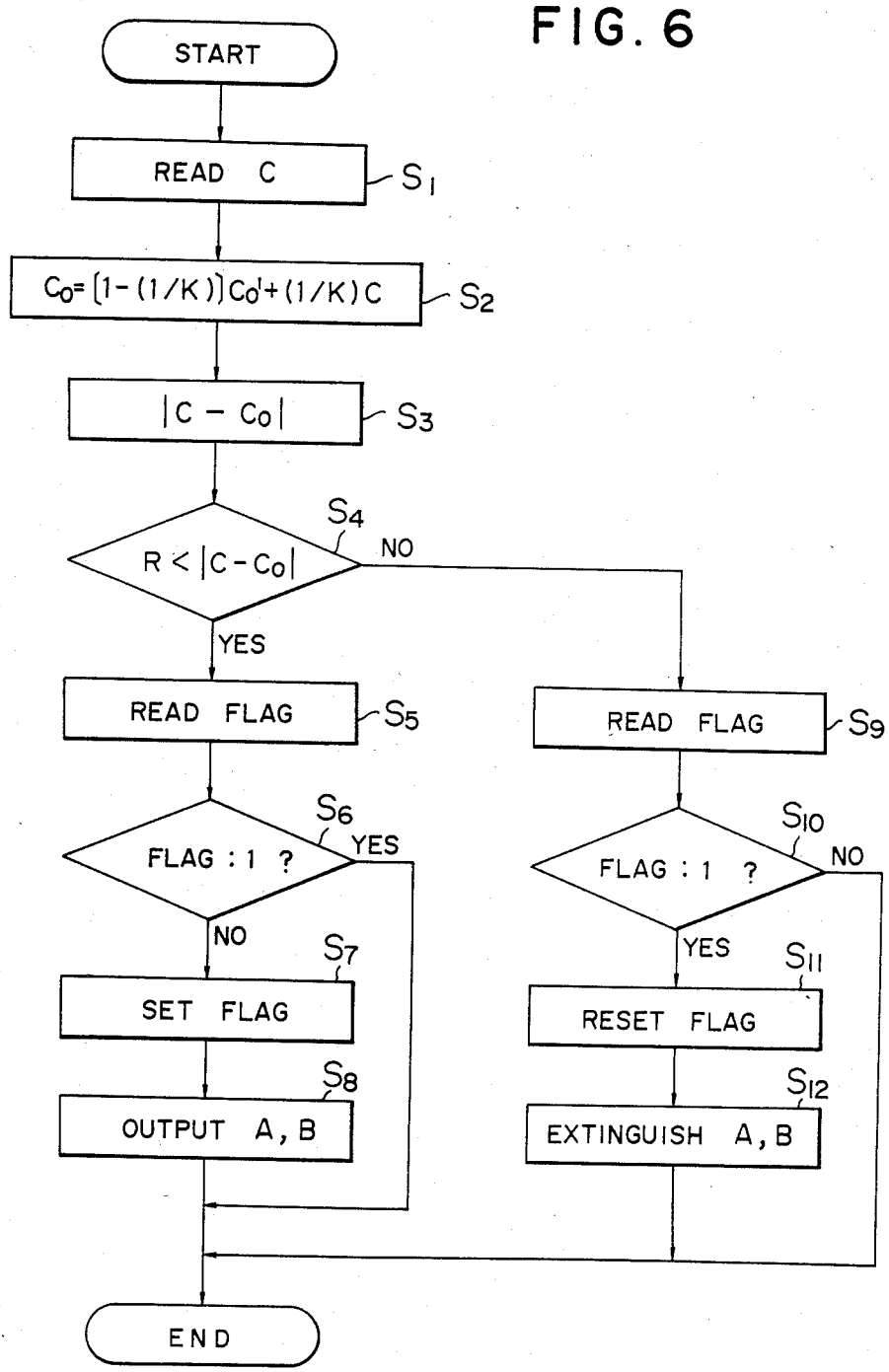
FIG. 6 is a flow chart showing the operation of the controller.

In accordance with the program shown in FIG. 6, which can be adopted in the present invention, the controller 12 first of all reads out the steering angle signal C denoting the steering angle $\theta$ in a first step $S_1$. In a second step $S_2$, the controller 12 calculates a weighted average value Co of the steering angle signals according to the formula:

$$Co = [1 - (1/k)]Co' + (1/k)C$$

wherein k is the number of times of the control cycles which are carried out, and Co' is the last weighted average value of the steering angle signals which are produced by the steering angle sensor 13 up to the time the sensor produces the last steering angle signal. Then, the absolute value of C minus Co, |C−Co| is calculated in a third step S$_3$. In a fourth step S$_4$, a judgement is made as to whether the calculated absolute value |C−Co| is larger than a predetermined value R. When the value |C−Co| is larger than R, a flag which denotes that the suspension mechanisms 3 and 4 are set to the hard suspension characteristics is read out in a fifth step S$_5$ and a judgement is made as to whether or not the flag is set to "1" in a sixth step S$_6$. When the flag is not set, the flag is set in a seventh step S$_7$, and the drive signals A and B are produced and applied to the step motor 8 and the solenoid valve 11 in an eighth step S$_8$.

On the other hand, when the judgement in the fourth step S$_4$ is "NO", or the value |C−Co| is not larger than R, the flag is read out in a ninth step S$_9$ and a judgement is made as to whether or not the flag is set to "1" in a tenth step S$_{10}$. When the flag is set, the flag is reset in an eleventh step S$_{11}$ and the signals A and B are extinguished in a twelfth step S$_{12}$.

Figure 7:
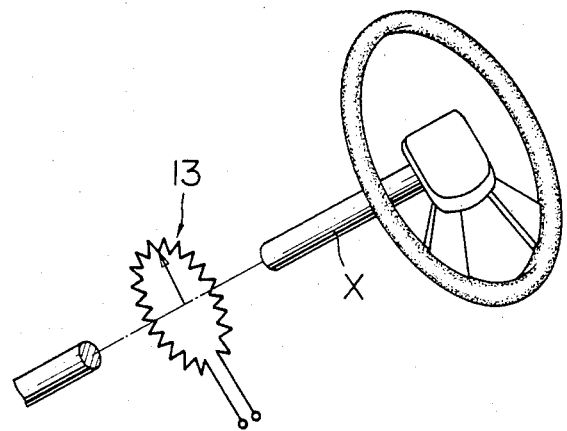
FIG. 7 is a perspective view of a steering angle sensor used in the suspension adjusting system shown in FIG. 1.

There may be used as the steering angle sensor 13 a variable resistor as shown in FIG. 7, the resistance value of which is varied in accordance with the rotation angle of shaft x of a steering wheel.

In operation, if the motor vehicle is running in a straight path, since the judgement of the fourth step S$_4$ in the program shown in FIG. 6 is "NO" and the judgement of the tenth step S$_{10}$ is "NO", the controller 12 does not produce the drive signals A, B. Thus, the orifice valve 39 is in the condition as shown in FIG. 4 to establish communication between the upper oil chamber 31 and the lower oil chamber 32 through the orifice 37a so that the damper 6 takes the soft mode, and the air chamber 7 is in communication with the accumulator 10 so that the air spring is constituted by air chamber 7 and accumulator 10.

Figure 8:
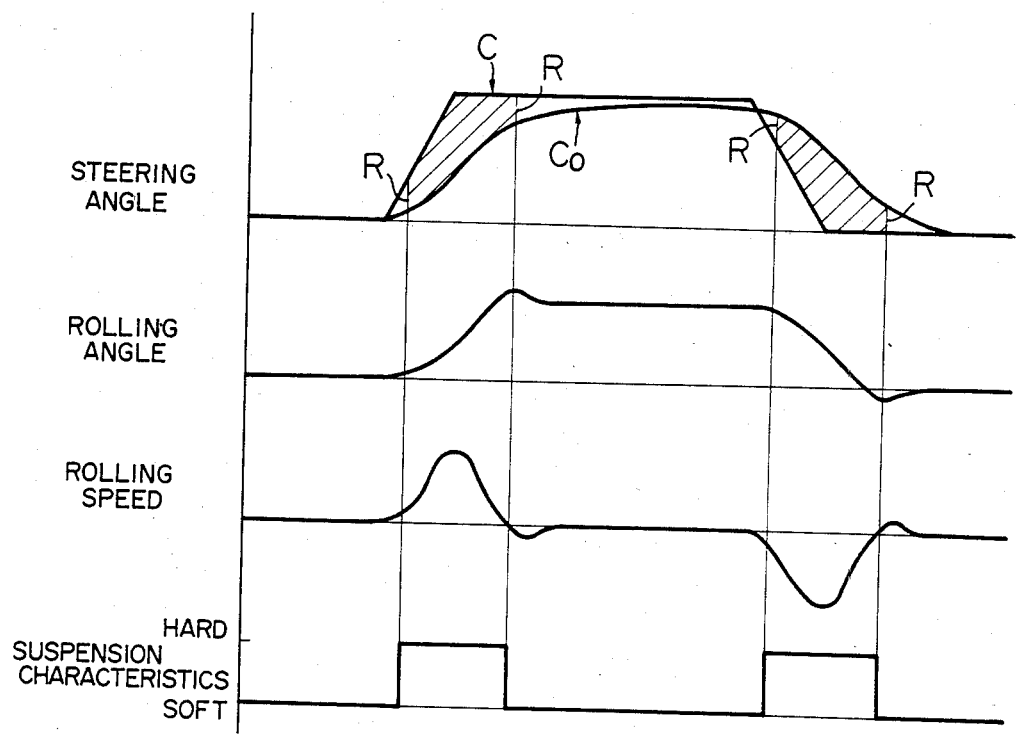
FIG. 8 shows the relationship among the steering angle, the rolling angle of the vehicle, the rolling speed and the suspension characteristics controlled in accordance with the present invention.

When the steering wheel is rotated to steer the vehicle, the controller 12 receives the steering angle signal C, and calculates the average value Co according to the above mentioned formula. The average value Co smoothly varies with a time delay with respect to the change of the signal C as shown in FIG. 8. When the difference between the signal C and the average value Co is larger than the predetermined value R, the controller 12 produces the drive signals A and B to the step motor 8 and the solenoid valve 11, thereby to close the orifice valve 39 and interrupt the communication between the air chamber 7 and the accumulator 11 so that the damper and the air spring are set to the hard mode.

When the rotation of the steering wheel is stopped to maintain the steering angle θ, the vehicle starts to be steadily steered and the average value Co gets close to the steering angle signal C so that the difference between these two signals progressively decreases. When the difference between C and Co becomes smaller than the predetermined value R, the signals A and B are extinguished so that the damper and the air spring are returned to the soft mode.

Where the steering wheel is reversely rotated in order to return the steering wheel to the neutral position, the average value Co decreases with a time lag with respect to the decrease in the steering angle signal C. When the difference between C and Co exceeds the predetermined value R, the controller 12 produces the drive signals A and B to set the damper and the air spring to the hard mode. When the steering wheel is returned to the neutral position, the average value Co gets close to the steering angle signal C. When the difference C and Co becomes smaller than the predetermined value R, the drive signals A and B are cut so that the damper and the air spring are returned to the soft mode.

It will thus be understood that in the period during which the steering angle θ is being changed to make the vehicle roll, the suspension mechanisms 3 and 4 are maintained at the hard suspension characteristics or the hard mode, thereby to suppress the rolling movements of the vehicle. On the other hand, during the steady state steering condition of the vehicle in which the rolling angle of the vehicle does not substantially vary, the suspension mechanisms 3 and 4 are set at the soft suspension characteristics or the soft mode so that the desired riding comfort is obtained.

Further, since the suspension characteristics are set in the hard mode only when the difference between the actual steering angle C and the average value Co of the varying steering angle exceeds a predetermined valve "R", the suspension characteristics are not changed due to the play of the steering mechanism.

In the above embodiment, the controller 12 calculates the average steering angle signal Co according to the formula in the flow chart shown in FIG. 6, however, alternatively, the controller 12 may calculate an average value C'o of steering angle signals Cn of a certain number, for example, N, produced between the start of the control and the production of a last steering angle signal according to the formula:

$$Co = \left( \sum_{n=1}^{N} Cn \right) /N,$$

Further, an average value C"o may be calculated according to the following formula by taking steering angle signals of an appropriate number, for example, M, which are taken by tracing back from the last signal $$C''o = \left( \sum_{n=N-M+1}^{N} Cn \right) /M.$$

The average value C'o is suitable for controlling only the air springs in the suspension mechanism, and the average value C"o is suitable for controlling only the dampers.

Figure 9:
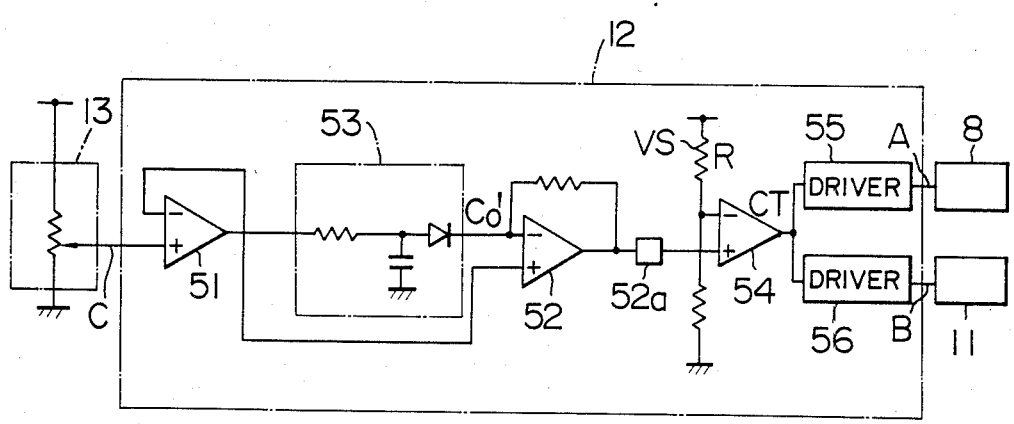
FIG. 9 is a circuit diagram showing a controller of analogue type used in the embodiment shown in FIG. 1.

The controller 12 may be constituted, for example, by analogue electrical circuits as shown in FIG. 9. The controller 12 is provided with a differential amplifier 52. With one of two inputs of the differential amplifier 52, there is connected the steering angle sensor 13 through an amplifier 51, and an integral circuit 53 for producing an average signal Co is connected with the other input thereof. The differential amplifier 52 receives the steering signal C and the average signal Co and outputs the differential signal C−Co. The output of the differential amplifier 52 is connected with one of two inputs of a comparator 54 through an absolute-value converter 52a. The other input of the comparator 54 is connected with a reference voltage generator VS for supplying a reference voltage R. The comparator 54 receives the absolute differential signal |C−C'o| and the reference voltage R and outputs a control signal CT when the signal |C−C'o| is larger than the reference voltage R.

With the output of the comparator 54 there are connected first and second drive circuits 55 and 56. The drive circuits 55 and 56 receive the control signal CT and output the driving signals A and B to the step motor 8 and the solenoid valve 11.

In the above embodiments, the damping powers of the dampers and the spring coefficients of the air springs are simultaneously controlled to change the suspension characteristics between the soft and hard modes, but alternatively only one of the damping powers and the spring coefficients may be controlled.

The invention has thus been shown and described with reference to specific embodiments, however, it should be noted that the invention is in no way limited to the details of the illustrated arrangements but changes and modifications may be made without departing from the scope of the appended claims.

We claim:

1. A motor vehicle comprising: a body, wheels for supporting said body, suspension means between said body and respective ones of said wheels; said suspension means including resistance means which provide resistance to vertical movement of said body with respect to said wheels, adjusting means for adjusting said resistance means of said suspension means to change the resistance, steering angle sensing means for producing steering angle signals, control means for controlling said adjusting means, said control means including means for comparing a last steering angle signal with an averge value of a plurality of steering angle signals produced by said steering angle sensing means during a period of time immediately preceding said last steering angle signal and generating a difference signal denoting the difference between said last steering angle signal and said average value of said steering angle signals, and means for comparing said difference signal with a predetermined difference signal value and for providing a drive signal for operating said adjusting means to increase the resistance of said resistance means when said difference signal is larger than said predetermined value.

2. A motor vehicle in accordance with claim 1 in which said resistance means includes damper means having variable damping rate, said adjusting means including means for varying the damping rate of said damping means.

3. A motor vehicle in accordance with claim 2 in which said control means includes means for calculating an average value of a plurality of previously produced steering angle signals and a last steering angle signal.

4. A motor vehicle in accordance with claim 2 in which said resistance means further include spring means having a spring coefficient, said adjusting means further having means for varying the spring coefficient of said spring means.

5. A motor vehicle in accordance with claim 4 in which said spring means includes air spring means.

6. A motor vehicle in accordance with claim 2 in which said damper means includes oil damper means of variable orifice type having orifice means of variable diameter between two oil chambers.

7. A motor vehicle in accordance with claim 1 in which said resistance means include air spring means having a spring coefficient, said adjusting means having means for varying the spring coefficient of said spring means.

8. A motor vehicle in accordance with claim 7 in which said control means includes means for calculating an average value of all steering angle signals generated in a steering operation, said control means comparing said last steering angle signal with said average value of said steering angle signals.

9. A motor vehicle in accordance with claim 1 in which said control means includes means for calculating a weighted average value of a plurality of previously produced steering angle signals and means for providing a last steering angle signal, said control means comparing said last steering angle signal with said weighted average value of said steering angle signals.

10. A motor vehicle in accordance with claim 9 in which said steering angle sensing means is a variable electrical resistance means in which the resistance value thereof is varied in accordance with the rotation of a steering wheel.

* * * * *